Patented June 4, 1929.

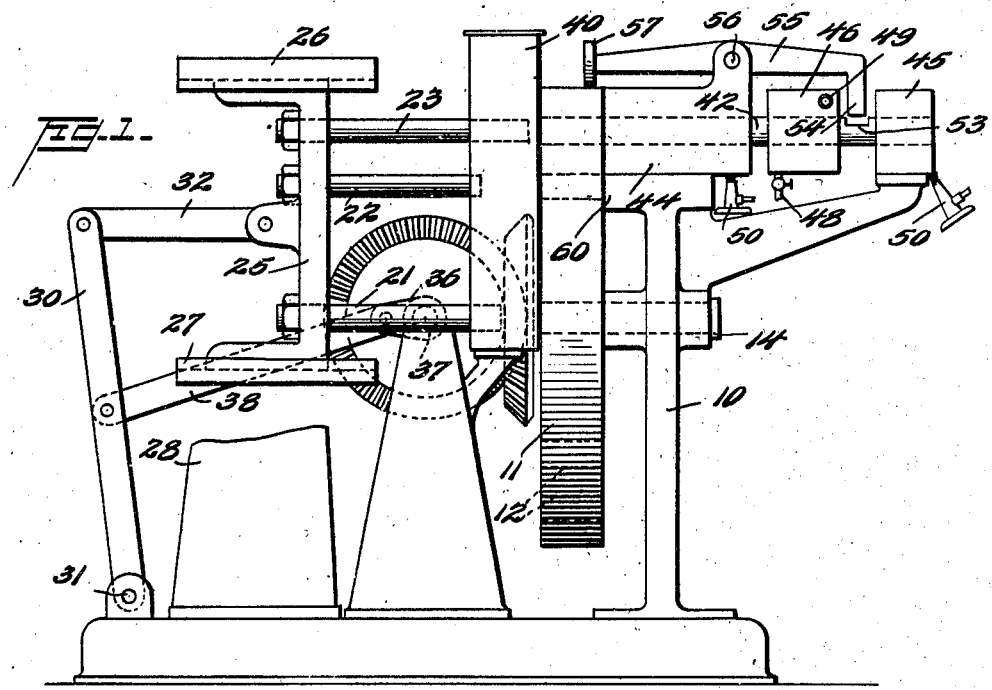
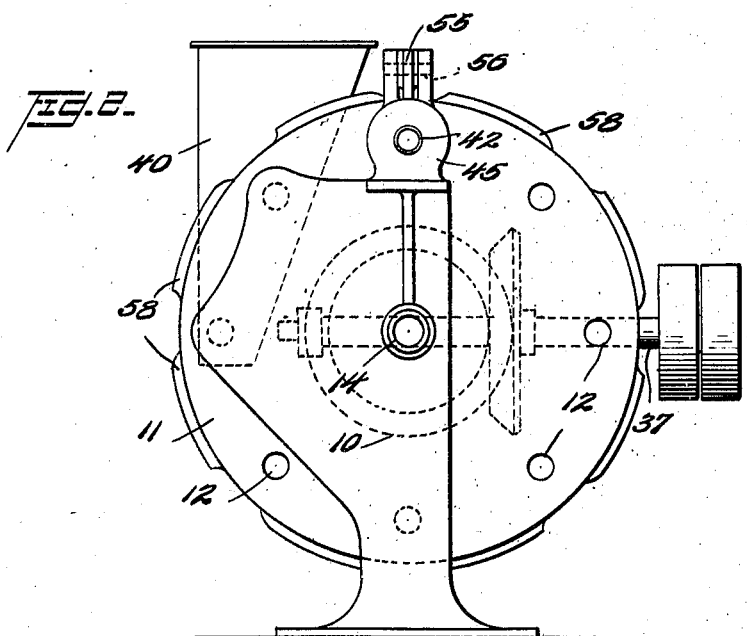

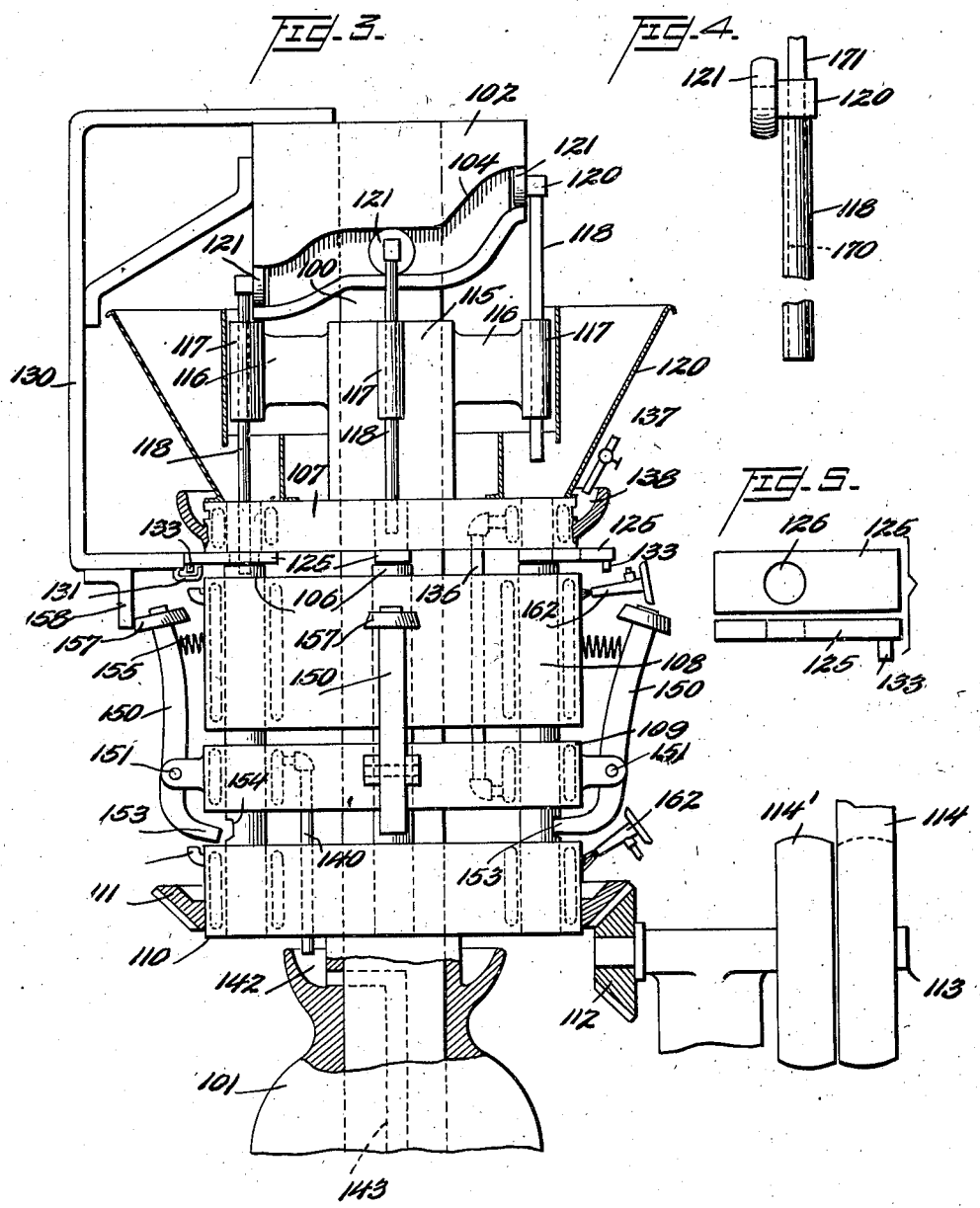

1,716,293

UNITED STATES PATENT OFFICE.

WILLIAM G. BOND, OF WILMINGTON, DELAWARE.

PROCESS OF AND APPARATUS FOR MAKING CORK ARTICLES.

Application filed May 22, 1925. Serial No. 32,207.

This invention relates to the art of manufacturing molded articles from finely divided matter with a binder which coagulates with heat and has for its principal object the provision of a process whereby an improved molded article is produced. A further object of the present invention is the provision of a method of making molded articles which have metal centers, or centers of material other than the article itself.

A still further object of the invention lies in the provision of an apparatus by which molded articles of the kind described may be produced conveniently and expeditiously.

In the drawings:—

Figure 1 is an elevation showing one form of apparatus for carrying out my invention.

Figure 2 is an end elevation of the machine of Figure 1.

Figure 3 is a general elevation of another form of machine for carrying out the invention, this particular machine lending itself more readily to the manufacture of sleeved articles such as caster wheels.

Figure 4 is a cross section through one of the rods.

Figure 5 is a plan view of one of the slides.

In the making of articles of comminuted cork the cork in small crumbs or particles have incorporated with them a binder of a type to set upon heating. It has been quite customary in the art to make this binder of glue or better still of a composition embodying glycerine, gelatine, water, paraffin and formalin, but I may prefer to use for this binder a phenol resin as this product coagulates nicely with heat and pressure and possesses water proof quality and non-inflammability as well as disinfectant properties, making cork articles in which phenol aldehyde is used, highly advantageous for use in refrigerators and elsewhere where the cork will be subject to dampness.

I place the cork and binder in a hopper and form a small slug of the material in a container of some kind preferably cooled by a circulating fluid such as water and then successively eject the slugs into a forming tube which is heated so that when the slugs are pressed into contact with those that have gone before they will unite so that the output of the machine is a continuous rod which may afterwards be cut to size desired.

In my previous work in this art I have invariably had a single heated zone and have chilled the last or exit zone of the tube, but I find that by adding a second heat zone and making this zone the exit one, I not only make possible a much greater production per hour but I secure a very much better product as the last heat zone reheats the peripheral surface of the formed or molded rod and leaves a zone of cooler material in the rod which zone even after ejection from the machine takes up heat from the still warm core and also from the heated peripheral surface thus eliminating the strain within the article, as the core will cool, because of this treatment, in approximately the same time as the surface.

In the form shown in Figure 1, a pedestal 10 pivotally supports a drum 11 which has therethru a plurality of holes 12 which may be of any desired cross section but being preferably cylindrical are so shown. This drum 11 may be water cooled if desired, in which case the inlet and outlet for the water jacket would pass through the pivoting shaft 14; as shown in the drawings, however, the drum is of sufficient size to radiate the heat at a sufficient rate to keep sufficiently cool and I have therefore not shown the water jacket although I should use such a device if the drum were made smaller.

Three plungers 21, 22 and 23 are bolted or otherwise rigidly secured to a cross head 25 sliding in cross head bearings 26 and 27 each supported from a bracket stand 28, the cross head receiving its movement from a lever 30 pivoted as at 31, connected to the cross head by a link 32, and connected to a crank 36 on the main drive shaft 37 by means of a pitman 38.

The three plungers are spaced from one another in such fashion as simultaneously to enter three consecutive holes or chambers 12 in the drum 11, the first preliminary packing plunger 21, being somewhat longer than the second preliminary packing plunger 22, serves to fill the chamber 12 with the comminuted cork particles having incorporated therewith the phenol aldehyde or other binder. It will be noted that these plungers 21 and 22 both pass through the hopper 40 but that the plunger 23, which ejects the slug of cork which has been packed in the hole 12 by the first preliminary packing plunger 21 and has been compressed by the second preliminary packing plunger 22, is located to one side of the hopper and discharges the slug directly from the cavity 12 into a forming tube 42 which is axially alined with the plunger 23 and with the uppermost hole 12 of the drum, when the latter comes to rest between its intermittent advancing motions.

Surrounding the forming tube 42 at its entrance end is a heat jacket 44; at the exit end of the forming tube I provide a second heat jacket 45, and between these two I place a cooling jacket 46, the latter preferably being water cooled, receiving the cold water from pipe 48 and discharging it in any convenient manner through the outlet pipe 49, either to a cooling means for return to the cycle or direct to waste if plenty of water is available.

The heat jackets may be formed in any way desired but I find it most convenient to use oil as the heating fluid and to apply the heat as diagrammatically indicated by the burners 50, direct to the walls of the heat jackets 44 and 45.

The forming tube has an orifice 53 rather snugly receiving the end 54 of a lever 55 pivoted as at 56 to the frame or to the initial heat jacket 44, this lever having at its far end a roller 57 operated by any one of a plurality of cams 58 on the periphery of the drum so designed and positioned that the end 54 of the lever will project into the orifice 53 of the forming tube each time the drum intermittently moves a step forward. The action of this lever is to retard or limit the travel of the formed rod of cork toward the exit end of the tube. Movement of the rod in the opposite direction, i. e. toward the entrance end of the tube, during travel of the drum is prevented by engagement of the continuous rod with the walls of the drum. Movement of the slugs to the right as seen in Figure 1 is prevented by an arcuate guard 60 serving also as a backing against which the plungers pack the cork, and movement toward the left is prevented by engagement with the wall of the hopper until the respective cavity is nearly ready to be discharged.

In the form shown in Figure 3, the forming tubes are arranged so as to be vertical. They are preferably four or more in number and are carried in and by a rotating mechanism pivotally mounted on a rather large central shaft or column 100 secured to a floor base 101 and carrying at its top a non-rotatable cylindrical cam 102 having in its periphery a cam groove 104.

The four forming tubes 106 have their entrance ends just below a drum 107 similar in general to the drum 11 of the device shown in Figure 1, which ends are surrounded by a hot jacket 108, the tubes then pass through a second cooling jacket 109 and finally through the hot jacket 110 which surrounds the exit ends of the four tubes thru which the molded cork is discharged exactly as in the previously described device.

The four jackets 107 to 110 rotate as a unit, the driving means being for example, a gear 111 carried by the lower hot jacket and being driven from a pinion 112 on the short drive shaft 113 receiving its power from any preferred source as for example, from the belt 114 which drives the pulley 114' fast on the shaft 113.

A hollow standard 115 having four radial arms 116 revolves with the jackets, each of the arms having a guiding sleeve 117 in which reciprocates a rod 118 carrying at its top an enlargement 120 to which is pivotally mounted a roller 121 which rides in the cam groove 104. Since there is little opposition to the raising of the plungers or rods 118 I may form the cam 102 as a hollow cylinder having its working cam surface at the bottom edge of the hollow cylinder but I prefer to eliminate the springs that would be required in such arrangement and I therefore form the cam surface as a groove, as shown.

In the modification shown in Figure 3 the rotation of the parts and therefore of the plungers 118 is continuous and not intermittent as in the device of Figure 1. The plunger shown at the right as seen in the figure is just starting to feed the comminuted cork and binder to the pocket of the drum 107 from the hopper 120, which it will be noted is conical in outside shape and which rotates with the jackets. The plunger shown in the center of the figure is packing the cork, which however is not pushed into the tubes 106 since there are slides 125 each with an orifice 126 having the same shape as the bore of the tubes and which are so placed as to prevent a thru passage from the drum 107 into the first heating jacket 108 until the slug of packed cork and binder reaches the point shown at the left of the figure at which time the cam 130 has engaged the slide 125 and pushed it in so as to have alined the hole 126 with the proper tube 106. The cam 130 like the cam 102 is stationary and the former carries a small lip 131 so that after discharge of the so-formed slug of cork from the drum 107 to the tube 106, the slide is withdrawn radially outward by engagement of a downturned lip 133, such engagement pulling the slide to the position shown at the right of the figure, that is, in the outermost position where it serves as a stop for the pockets of the drum.

The cold jackets 107 and 109, since they rotate together, may be permanently secured for the circulation of the cooling fluid as for example, by the pipe 136. Water is fed through the pipe 137 to an annular trough 138, the water circulating through the entire jacket and discharging through the pipe 136 to the jacket 109 from whence the warmed water is discharged through the pipe 140 to a stationary, annular trough 142 carried by the base, such trough having its outlet through the pipe 143 in the base.

The operation is as follows:—

The comminuted cork particles with the binder is fed into the hopper 120. The plunger 118 shown at the right pushes a quantity of this cork down into a pocket of the drum 107, the pockets each being of a cross section exactly the same as the bore of the tube 106 and obviously axially alined therewith. At such time the slide 125 forms a bottom for the pocket as the hole 126 in the slide is at this time to the right of the pocket in the drum 107.

The plunger 118 descends continuously, packing the cork quite tightly and finally discharging it upon pushing in of the slide 125 by the cam 130 to bring the orifice 126 in registry with the pocket and tube. The last few slugs discharged into the tube are still soft since the heated jacket 108 surrounding the entrance end of the tube has not yet had time to act so that the slugs unite forming a continuous rod as in the previously described machine.

The plungers rise as they pass through the 180° hidden in the figure so that the plunger shown at the right is at the highest position, and ready to feed a quantity of loose cork into the preliminary receiving drum 107. In order to prevent axial expansion of the rod of cork I prefer to have a lever 150 pivoted as at 151 serving exactly the same purpose as the lever 55 in the form shown in Figure 1. The end 153 of the lever passes into an orifice 154 and adds materially to the friction on the formed rod and retards or entirely stops as desired its progress downward. A spring 155 constantly urges the upper end of the lever outward, such end pivotally carrying a roller 157 which engages the cam bracket 158, there being a lever 150 for each of the tubes, so that at the time each successive slug is fed into the tube the pressure of the lever is withdrawn by engagement of the cam 158 and roller 157. During all the remainder of the revolution, the spring closes the lever on the molded cork rod.

In many cases to obtain a greater density in packing and a more perfect joint between particles in large size bars I have found it good practice to have lever 55 or 150, as the case may be, acting to retard or stop the travel of the cork at the time the drum is stopped and while cork is being pushed in, and in such cases the lever moves to release position at time of each intermittent movement of the drum.

The hot jackets 108 and 110 are filled with oil or other fluid in any way desired, as for example, thru the pipes 160, and are heated by a series of gas burners or other heating devices 162. Obviously live steam may be used as the heating medium in place of the oil.

The specific form shown in this figure is preferred for many purposes, lending itself particularly convenient to the making of caster rollers. In case there is to be a core for the cork, whether a solid rod or a tube, the plungers 118 are made hollow as shown in Figure 4, the central hole 170 being of size to slip freely over the cores 171 which are fed downwardly by gravity until they meet the cork and from then on they are fed downwardly by the adherence of the cork to them. The cork grips the core lightly in the drum 107 holding it only by the friction of the compression of the cork against the core, but there is nothing to hold the cores back in their downward movement, on the contrary both gravity and the firm adherence between the cork particles and the core or cores at the bottom of the heating zones insures this movement together of the cork and cores. The cores are of different shapes and sizes, for example, leads for pencils, bushings for wheels, spring barrels for shade rollers and so forth and are not necessarily circular in cross section neither is it necessary that the tubes themselves be circular in cross section. When using a core the slide 125 is made in two pieces, each cam operated so as to permit passage at all times of the core rod while permitting the packing of the slug about the rod in the preliminary drum.

Slow evaporation of any moisture or liquid solvent tends to cause shrinking after the cork is molded and this naturally helps to cause greater gripping on metal center. Where it is desirable to form a central opening without any metal lining, the rods or cores 171 are held rigidly as for example by securing same to the large sleeves 117, the plungers 118 with their central holes 170 being slotted for this purpose in such case. The rods or cores may be heated and cooled in portions as desired.

In describing my process I have referred to the particles as being of comminuted cork but other material besides cork can be used, such for example as saw dust, leather shavings, mixtures of asbestos and cork, etc. In making cork bars that are to be cut into disks, etc. I enlarge the passageway before coming to the exit end and by means of the heat in the core, the heat from the last heating zone or both I expand the cork bar to proper size and density.

What I claim is:

1. The process of forming a molded article having a center of different material which consists in forcing comminuted particles and a binder thru a passage and around a pre-formed rod of said material, compressing the particles against the rod and against the walls of said passage, whereby the rod is fed forwardly with the particles by friction therewith, subjecting the compressed particles to heat, and finally cooling the particles while still compressed.

2. The process of extruding a cork bar, which consists in forcing comminuted cork and a binder thru a tubular passageway, feeding a rod axially thru said passageway, applying intermittent pressure to said cork to pack it about said rod, and to feed it and said rod thru said passageway, and in alternately heating and cooling the cork in its passage.

3. The process of extruding a sleeved cork bar, which consists in forcing comminuted cork and a binder thru a tubular passageway, feeding a hollow rod axially thru said passageway, applying intermittent pressure to said cork to pack it about said rod and to feed it and said rod thru said passageway, and in alternately heating and cooling the cork in its passage.

4. The process of forming articles of cork which consists in packing comminuted cork and binder to form a slug, compressing said slug, and in forcing said slug in contact with similar previously formed compressed slugs thru an open-ended heated confining passageway.

5. The process of claim 4 in which the slugs which have been united by their travel thru the heated passageway and are subsequently chilled before being released from the passageway.

6. The process of claim 4 in which the slugs which have been united by their travel thru the heated passageway, are subsequently chilled and then reheated before being released from the passageway.

7. The process of forming articles of comminuted cork which consists feeding increments of cork into an auxiliary mold and partly compressing the same therein, transferring the partly compressed increments in succession into an open ended passage and applying final pressure thereto.

8. The process of forming articles of cork which consists in, first, partly compressing in succession predetermined increments of cork in an auxiliary mold, transferring the partly compressed increments in succession into an open ended passage, and third, applying final pressure to each increment in said passage.

9. The process of extruding cork which consists in feeding a rigid rod axially of a passageway having alternate cooling and heating zones, feeding comminuted cork and a binder thru said passageway and about said rod by successive increments.

10. The process of claim 9 in which the exit zone is a heating zone.

11. The process of claim 9 in which the exit zone is a heating zone and the cork is free to move thru the final heating zone except for its friction with the passage, but in which the cork is held from axial movement at a point in rear of the final zone at regular intervals.

12. The process of extruding cork, which consists in forcing comminuted cork and binder thru a confining tube or die by successively applied impulses and increment additions, and in creating a transverse zone of high temperature intermediate the entrance and exit ends of the tube or die, and in creating a further high temperature transverse zone at the exit end of the tube.

13. In an apparatus for extruding cork, the combination of means for feeding comminuted cork, a tube or die thru which the cork is forced by the feeding mechanism, and means for creating preliminary and intermediate cooling zones and an intermediate and a final heating zone in said tube or die.

14. In a device of the character described, a plurality of parallel open ended tubes, a drum having a plurality of openings therein, means for feeding comminuted particles and a binder into said drum and for subsequently feeding such matter from the drum to the tubes, means for creating a transverse heated zone at the entrance end of each tube and separate means for creating a cold zone about each of said tubes.

15. In a device of the character described, a plurality of forming tubes rotatable about a vertical axis, a drum concentric therewith, means for feeding material to the drum, compressing it while in the drum, and for feeding the compressed portions to said tubes, a plurality of jackets surrounding each of the tubes, means for heating a plurality of said jackets and means for cooling an intermediate jacket.

16. In combination, a base, a plurality of jackets rotatably mounted on said base, a plurality of tubes extending successively through said jackets, means for heating the jackets nearest the ends of the tubes, means for cooling an intermediate jacket, a drum coaxial with said jackets and having openings therein, means for cooling said drum, a plurality of plungers adapted to pack comminuted particles in the openings of the drum, and means intermittently affording communication between the drum and said tubes.

17. The process of claim 9 in which the exit zone is a heating zone and the cork is free to move thru the final heating zone except for its friction with the passage, but in which the cork is held from axial movement at a point in rear of the final zone at regular intervals.

18. The process of forming articles of comminuted material with a binder in an auxiliary mold to form a slug, transferring the slug to a heated open ended passageway, and applying pressure to said slug to force it thru the passageway and to cause it to unite with the previously formed slugs.

19. The process of claim 18 in which the slugs are chilled in the passageway after uniting and later reheated to a less temperature than the initial heat of the passageway.

20. The process of claim 9 in which the passageway is vertical and the rod is fed downwardly by friction of the cork particles.

21. The process of claim 9 in which the exit is a heating zone the cork being held from axial movement at any point after action of first heating zone at regular intervals.

22. The process of extruding cork which consists in feeding comminuted cork and a binder thru a passageway by successive increments, said passageway having alternate cooling and heating zones, the exit zone being a heating zone and the cork is free to move thru the final heating zone except for its friction with the passage, but in which the cork is held from axial movement at a point in rear of the final zone at regular intervals.

23. The process of extruding cork which consists in feeding comminuted cork and binder thru a passageway by successive increments, said passageway having alternate cooling and heating zones, and the cork is free to move thru except when it is held from axial movement at regular intervals.

24. The process of extruding cork which consists in feeding comminuted cork and a binder thru a passageway by successive increments, said passageway having alternating cooling and heating zones, the exit zone being a heating zone, the cork being expanded prior to exit from said passageway.

25. The process of claim 24, the cork being expanded any point after setting of the binder.

26. In a device of the character described, the combination of a plurality of vertical open ended tubes having heating and cooling zones with a plurality of plungers capable of entering therein, and means for packing the cork before entering the tubes.

27. In a device of the character described, means for feeding comminuted material, a tube thru which the material is fed by said means, and intermittently operated means located between the ends of the tube and near the feeding end thereof for closing the tube, so that the feeding means compresses the fed material in slugs against said tube closing means.

28. The device of claim 27 in which the tube is vertical.

29. The device of claim 27 in which the tube is vertical and the closing means is a horizontally movable slide.

In testimony whereof I affix my signature.

WILLIAM G. BOND.